United States Patent Office 2,838,728
Patented June 10, 1958

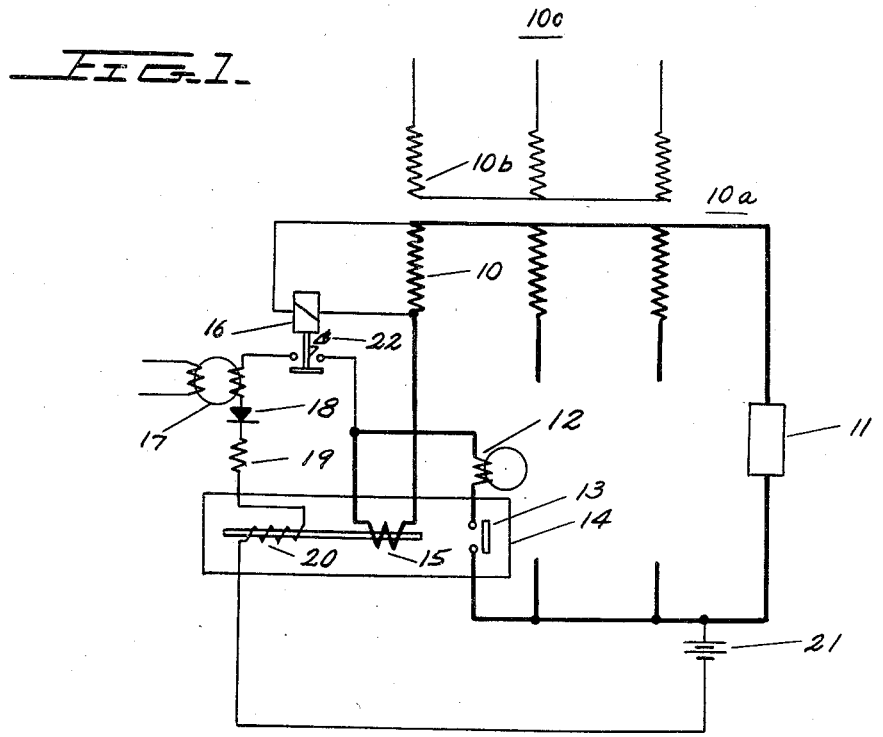
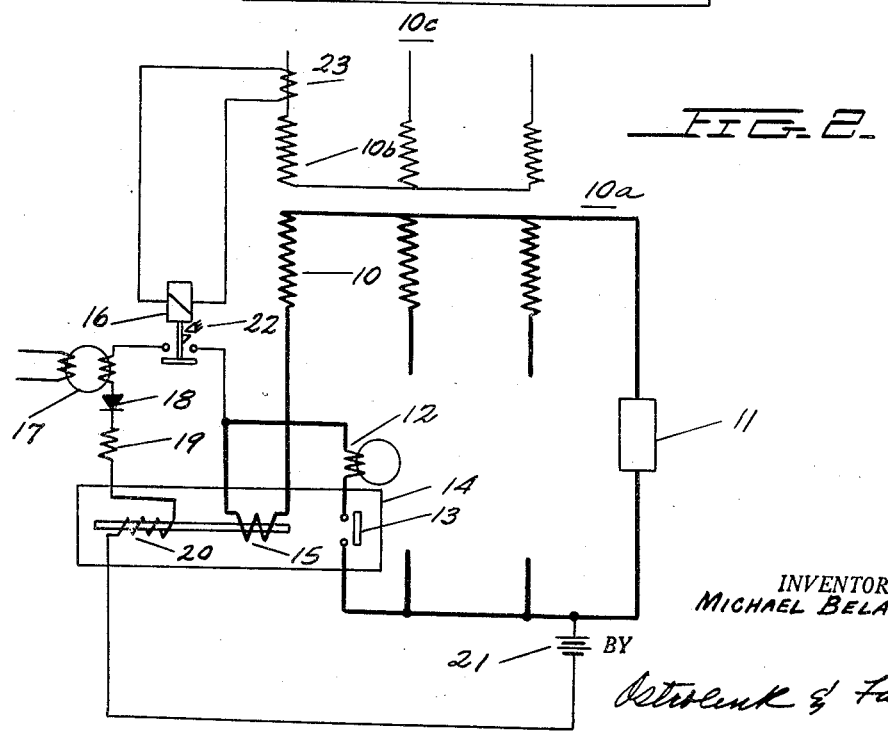

2,838,728

DE-ENERGIZATION OF A BY-PASS CIRCUIT IN AN ELECTROMAGNETIC RECTIFIER DURING FAULT CONDITIONS

Michael Belamin, Nurnberg, Germany, assignor to Siemens-Schuckertwerke A. G., Berlin, Germany, a corporation of Germany Application February 28, 1955, Serial No. 491,126

7 Claims. (Cl. 321—48)

My invention relates to an over current protective device for electromagnetic rectifiers. Electromagnetic rectifiers, to which my invention can be applied, are shown in co-pending application Serial No. 257,398, filed November 20, 1951, which describes various circuits for electromagnetic rectifiers and structures for electromagnetic switches. Other co-pending applications describing electromagnetic rectifier circuits and switches are Serial No. 412,165, filed February 25, 1954, and Serial No. 491,350, filed March 1, 1955. My novel invention can also be applied to an inverter having an electromagnetic switch as described in co-pending application Serial No. 364,421, filed June 26, 1953.

Electromagnetic rectifiers in general comprise an A. C. source, a commutating reactor, an electromagnetic switch and a D. C. load. Each phase of the rectifier comprises a commutating reactor which is a saturable type reactor having a very low magnetizing current in series with the cooperating contacts of the electromagnetic switch. The cooperating contacts are operated into and out of engagement to thereby connect and disconnect the A. C. source to the D. C. load by a magnetic field created by a by-pass circuit which is a circuit which operates in parallel to the cooperating contacts. The circuit conditions are such that when the contacts are being opened or closed, the commutating reactor will unsaturate to thereby provide a protective low current step. This circuit is a self-thinking device since the by-pass circuit operates the cooperating contacts in synchronism with the A. C. input frequency.

These circuit conditions, however, lead to the disadvantage that the contacts continue to operate under short circuit conditions until appropriate fault current interrupting means are activated.

Since the short circuit current could possibly be 50 or more times as great as the rated current of the sensitive contacts of an electromagnetic switch, fault current operation for only a few cycles could lead to the complete destruction or serious damage of the contacts. Because of this, it has been necessary to provide high speed circuit breakers in the A. C. lines. These circuit breakers are large and expensive since they must be fast and must be rated at the rated voltage and current of the rectifier.

The principle of my invention is to provide a high speed interrupting means in the by-pass circuit which is responsive to fault conditions and only carries the relatively small current of the by-pass circuit.

One embodiment of my principle would be to provide an under voltage relay having cooperating contacts in series with the by-pass circuit and its operating coil to be energized from the A. C. power supply of the electromagnetic rectifier. Upon fault current conditions the power supply voltage will decrease due to regulation to thereby de-energize the relay coil and disengage the relay contacts in the by-pass circuit, hence de-energizing the magnetic field which operates the contacts.

Therefore, the use of my novel combination of an under voltage relay and a by-pass circuit of an electromagnetic rectifier will de-energize contact operation within at least one cycle after fault conditions appear.

Another embodiment would be to provide a device which would operate the interrupting means in the by-pass circuit in response to the fault current itself such as a current transformer in the main line to energize a relay in the by-pass circuit.

For purposes of simplicity, my novel invention is described hereinafter with respect to the embodiment of a relay responsive to the A. C. voltage which will regulate down under fault conditions.

Accordingly, it is a primary object of my invention to provide high speed fault protective equipment for an electromagnetic rectifier which only interrupts the by-pass circuit current.

Another object of my invention is to provide an interrupting means in the by-pass circuit of an electromagnetic switch which is responsive to fault current flowing through the electromagnetic switch contacts.

Another object of my invention is to provide a novel combination of an under voltage relay and the by-pass circuit of an electromagnetic rectifier to achieve fault current protection of the electromagnetic switch contacts.

Another object of my invention is to provide a relay in series with the by-pass circuit of an electromagnetic switch which is responsive to the voltage of a current transformer in the main current carrying lines.

Still another object of my invention is to provide a relay for the by-pass circuit for an electromagnetic rectifier having its cooperating contacts in series with the energizing means of the electromagnetic switch cooperating contacts.

These and other objects of my invention will be apparent from the following description when taken in connection with the figures in which:

Figure 1 shows an electromagnetic rectifier having an undervoltage relay according to my novel invention in the by-pass circuit.

Figure 2 shows the electromagnetic rectifier of Figure 1 in conjunction with a by-pass circuit relay which is responsive to the energization of a current transformer.

As shown in the figures, A. C. source 10 is the secondary winding of transformer 10a in which the primary winding 10b is energized from the A. C. line 10c.

For purposes of simplicity the electromagnetic rectifier shown in the figures is only completed for one phase. The completion of this diagram to the other phases will be obvious to anyone skilled in the art.

It should be noted that although I show my novel device with relation to a particular electromagnetic rectifier circuit, my novel invention can be universally applied to any device in which an electromagnetic switch is operated by a by-pass circuit.

In Figure 1, power source 10 is in series with a commutating reactor 12, the cooperating contacts 13 of the electromagnetic switch shown in box 14, the main holding coil 15 of electromagnetic switch 14 and the D. C. load 11.

The by-pass circuit comprises a series connection of the cooperating contacts of under voltage relay 16, a regulation means 17, a dry cell rectifier 18, a current limiting resistor 19, an operated coil 20 and a D. C. source 21.

Undervoltage relay 16 is provided with a means to latch it in the open position and is shown in Figure 1 as latch 22.

My invention is directed to the combination of the under voltage relay 16 having its cooperating contacts in series with this circuit and its operating coil energized from the power source 10.

The regulating means 17 serves to delay the initiation of current through this circuit in order to achieve regulation of the output voltage. This voltage regulation means can be a grid controlled thyratron or D. C. bias controlled saturable reactor as is shown in the figures. The D. C. source 21 serves to bias the operation of the electromagnetic switch.

Note that the current is not initiated through the main circuit comprising commutating reactor 12 and the electromagnetic switch contacts 13 since the electromagnetic switch contacts 13 are open. However, as soon as the current in the by-pass circuit reaches a value high enough to sufficiently energize coil 20, the magnetic field created by operating coil 20 causes the engagement of the main electromagnetic switch contacts 14. Hence a current can now flow from D. C. source 10, holding coil 15, commutating reactor 12, contacts 13 and D. C. load 11. However, the in-rush current to the contacts 13 is limited to a very small value by commutating reactor 12 until the commutating reactor 12 saturates. Hence a protective low current step is provided while the contacts 13 engage. With the engagement of contacts 13 and the saturation of the commutating reactor 12, the potential of power source 10 now falls across D. C. load 11 in the desired direction.

Upon reversal of the voltage of power source 10, it is now desired to open the electromagnetic switch contacts 13 to thereby eliminate the potential of the phase in question from the D. C. load. Hence when the phase voltage decreases to a value low enough, the phase current through holding coil 15 decreases to a value low enough to allow commutating reactor 12 to unsaturate. Upon unsaturation of commutating reactor 12 the full voltage of the A. C. source falls across the winding of commutating reactor 12. This potential has a positive value at the bottom of the commutating reactor winding and thereby creates a current in the by-pass circuit which is a direction opposite to the normal by-pass current flow.

Hence, at a predetermined time, the current through operating coil 20 is bucked down to a value low enough to allow the electromagnetic switch contacts 13 to disengage. Note that the disengagement of the contacts occurs at a time when the commutating reactor 12 is unsaturated to thereby provide a low current protective step for the opening of contacts 13.

In the above operation it was always assumed that rated load current was flowing and the voltage of the power source was at a rated value. If, however, a fault condition occurs in the rectifier such as a short circuit of the D. C. load, the phase current will increase to a very high value and the A. C. input voltage of power source 12 will decrease due to regulation.

With this condition, the under voltage relay 16, which can be calibrated to drop out at a predetermined voltage, will open the by-pass circuit and will be latched open by latch 22. Hence during the next cycle, a by-pass current cannot be initiated to subsequently engage cooperating contacts 13 of the electromagnetic switch 14.

Therefore, by using my novel combination, I can rapidly disconnect the cooperating contacts of the electromagnetic switch to prevent them from passing the high fault currents which could destroy them, thereby eliminating the need for high speed circuit breakers rated at the rated value of the rectifier.

In the embodiment of Figure 2, the rectifier operation is exactly the same as noted above.

In this case, however, relay 16 is made responsive to fault current conditions by means of current transformer 23 which is in the A. C. line 10c. Upon fault conditions, the current in line 10c will increase sharply and this rising current will be reflected in the coil of relay 16. By constructing relay 16 to drop out at a predetermined current, the relay contacts will be opened in response to fault conditions to thereby de-energize the electromagnetic switch 16 in response to faults. Hence, as in the case of the embodiment of Figure 1, the use of a current transformer and a relay responsive to overcurrent and placed in the by-pass circuit eliminates the need for high speed protective equipment which is rated at the voltage and current ratings of the rectifier.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appended claims.

I claim:

1. In an electromagnetic rectifier energizing a direct current load from an alternating current source; said electromagnetic rectifier having cooperating contacts operable responsive to a magnetic field in series with a saturable type reactor, said cooperating contacts and saturable type reactor connected to place said alternating current source in series with said direct current load when said cooperating contacts are engaged; an auxiliary circuit constructed to create a magnetic field to cause engagement of said cooperating contacts in response to a predetermined instantaneous voltage of said alternating current source; and a switching means in series with said auxiliary circuit constructed to be disengaged responsive to a predetermined voltage of said alternating current source.

2. In an electromagnetic rectifier energizing a direct current load from an alternating current source; said electromagnetic rectifier having cooperating contacts operable responsive to a magnetic field in series with a saturable type reactor, said cooperating contacts and saturable type reactor connected to place said alternating current source in series with said direct current load when said cooperating contacts are engaged; an auxiliary circuit constructed to create a magnetic field to cause engagement of said cooperating contacts in response to a predetermined instantaneous voltage of said alternating current source; and an under voltage relay having contacts in series with said auxiliary circuit, said relay constructed to cause said relay contacts to disengage responsive to a predetermined under voltage of said alternating current source.

3. In an electromagentic rectifier to energize a direct current load from an alternating current source; said electromagnetic rectifier having cooperating contacts, a closing coil and an opening means; said cooperating contacts constructed to be engaged responsive to the energization of said closing coil and disengage responsive to the energization of said opening means, said cooperating contacts positioned to place said alternating current source in series with said direct current load when said cooperating contacts are engaged; a by-pass circuit constructed to energize said closing coil from said alternating current source at a predetermined time; a relay having an energizing coil connected to said alternating current source and contacts in series with said by-pass circuit, and constructed to disengage said relay contacts responsive to a predetermined under voltage of said alternating current source, and means to maintain the said relay contacts in said disengaged position.

4. In an electromagnetic rectifier to energize a direct current load from an alternating current source; said electromagnetic rectifier having cooperating contacts, a closing coil and an opening means; said cooperating contacts constructed to be engaged responsive to the energization of said closing coil and disengage responsive to the energization of said opening means, said cooperating contacts positioned to place said alternating current source in series with said direct current load when said cooperating contacts are engaged; a by-pass circuit constructed to energize said closing coil from said alternating current source at a predetermined time; a relay having contacts in series with said by-pass circuit and an energizing coil energized in response to fault current.

5. In an electromagnetic rectifier to energize a direct current load from an alternating current source; said electromagnetic rectifier having cooperating contacts, a closing coil and an opening means; said cooperating contacts constructed to be engaged responsive to the energization of said closing coil and disengage responsive to the energization of said opening means, said cooperating contacts positioned to place said alternating current source in series with said direct current load when said cooperating contacts are engaged; a by-pass circuit constructed to energize said closing coil from said alternating current source at a predetermined time; a relay having contacts in series with said by-pass circuit and an energizing coil energized in response to fault current, said relay constructed to disengage said relay contacts in response to a predetermined current and means to maintain said relay contacts in said disengaged position.

6. In an electromagnetic rectifier energizing a direct current load from an alternating current source; said electromagnetic rectifier having cooperating contacts operable responsive to a magnetic field in series with a saturable type reactor, said cooperating contacts and saturable type reactor connected to place said alternating current source in series with said direct current load when said cooperating contacts are engaged; an auxiliary circuit constructed to create a magnetic field to cause engagement of said cooperating contacts in response to a predetermined instantaneous voltage of said alternating current source; and a switching means in series with said auxiliary circuit constructed to be disengaged responsive to a predetermined fault condition.

7. In an electromagnetic rectifier to energize a direct current load from an alternating current source; said electromagnetic rectifier having cooperating contacts, a closing coil and an opening means; said cooperating contacts constructed to be engaged responsive to the energization of said closing coil and disengage responsive to the energization of said opening means, said cooperating contacts positioned to place said alternating current source in series with said direct current load when said cooperating contacts are engaged; a by-pass circuit constructed to energize said closing coil from said alternating current source at a predetermined time; a relay having an energizing coil connected to be energized responsive to predetermined fault conditions and contacts in series with said by-pass circuit, and constructed to disengage said relay contacts responsive to said predetermined conditions and means to maintain the said relay contacts in said disengaged position.

References Cited in the file of this patent

UNITED STATES PATENTS

| 2,280,945 | Gamel | Apr. 28, 1942 |
| 2,346,971 | Kennedy | Apr. 18, 1944 |

FOREIGN PATENTS

| 113,439 | Sweden | Mar. 13, 1945 |